United States Patent
Edirisooriya et al.

(10) Patent No.: US 7,464,227 B2
(45) Date of Patent: Dec. 9, 2008

(54) METHOD AND APPARATUS FOR SUPPORTING OPPORTUNISTIC SHARING IN COHERENT MULTIPROCESSORS

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/316,785

(22) Filed: Dec. 10, 2002

(65) Prior Publication Data

US 2004/0111566 A1   Jun. 10, 2004

(51) Int. Cl.
*G06F 12/08* (2006.01)
(52) U.S. Cl. .................... 711/144; 711/141; 711/146
(58) Field of Classification Search ................. 711/141, 711/144–146, 119–120
See application file for complete search history.

(56) References Cited

U.S. PATENT DOCUMENTS

| | | | | |
|---|---|---|---|---|
| 5,708,792 A | * | 1/1998 | Hayes et al. | 711/146 |
| 5,765,199 A | * | 6/1998 | Chang et al. | 711/168 |
| 6,378,048 B1 | * | 4/2002 | Prudvi et al. | 711/144 |
| 6,678,798 B1 | * | 1/2004 | Kuskin et al. | 711/141 |
| 6,801,986 B2 | * | 10/2004 | Steely et al. | 711/152 |
| 6,898,676 B2 | * | 5/2005 | Van Doren et al. | 711/141 |
| 6,918,008 B2 | * | 7/2005 | Rowlands | 711/133 |
| 7,177,983 B2 | * | 2/2007 | Royer | 711/133 |
| 2002/0078305 A1 | * | 6/2002 | Khare et al. | 711/144 |

FOREIGN PATENT DOCUMENTS

EP    0 691 613 A1  * 10/1996

* cited by examiner

*Primary Examiner*—Pierre-Michel Bataille
(74) *Attorney, Agent, or Firm*—Erik M. Metzger (57) ABSTRACT

A system and method for improved cache performance is disclosed. In one embodiment, a processor with a cache having a dirty cache line subject to eviction may send the dirty cache line to an available replacement block in another processor's cache. In one embodiment, an available replacement block may contain a cache line in an invalid state. In another embodiment, an available replacement block may contain a cache line in an invalid state or in a shared state. Multiple transfers of the dirty cache line to more than one processor's cache may be inhibited using a set of accept signals and backoff signals. These accept signals may be combined to inhibit multiple processors from accepting the dirty cache line, as well as to inhibit the system memory from accepting the dirty cache line.

27 Claims, 5 Drawing Sheets

FIG. 5

METHOD AND APPARATUS FOR SUPPORTING OPPORTUNISTIC SHARING IN COHERENT MULTIPROCESSORS

FIELD

The present disclosure relates generally to microprocessor systems, and more specifically to microprocessor systems capable of operating in a multiprocessor environment with coherent caches.

BACKGROUND

Processors may use caches in order to have more rapid access to data than would be possible if all data needed to be accessed directly from system memory. It is possible to read from cache much faster than reading from system memory. It is also possible to write to cache, and put off updating the corresponding data in system memory until a time convenient for the processor or its cache. When using processor caches in multiprocessor environments, care must be taken to ensure that the various copies of the data are the same, or at least that any changes be tracked and accounted for. Strict equality of the data is not necessary or even desired: as mentioned above, sometimes the cache will contain modified data and will update the system memory later. Similarly, several processors may share data. If one processor writes an updated copy of the data into its cache, it should either tell the other processors that it did so in order that they may not trust their data in the future, or it should send a copy of the updated data around to the other processors. Various sets of rules that ensure the coherency, if not the equality, of data in multiple processors' caches are called cache coherency schemes.

One family of cache coherency schemes are those using a write-back cache. In a write-back cache, data in the cache may be modified, often by writing to the cache and setting the status to modified or "M" status, or to an owned or "O" status. The O state may be considered a modified-shared state, which allows shared data that is modified to remain in the cache. The cache that contains an O cache line takes on the responsibility to update the memory at a later time. Cache lines with either a modified or "M" status, or to an owned or "O" status, may be called dirty cache lines. However, the copy of the data in memory may remain in the non-dirty state, avoiding the immediate need to write the dirty data to memory. This may yield performance improvements over writing the dirty data to memory immediately subsequent to the modification of the data within the cache. Generally, the dirty data will be written into memory subsequent to a triggering event. These triggering events may include evicting the dirty cache line because another cache line wishes to replace it in the corresponding block within the cache, or because another processor wishes to modify the same cache line.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for operating caches in a microprocessor system. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware within a microprocessor system. However, the invention may be practiced in other forms of processor such as a digital signal processor, or with computers containing a processor, such as a minicomputer or a mainframe computer.

Figure 1:
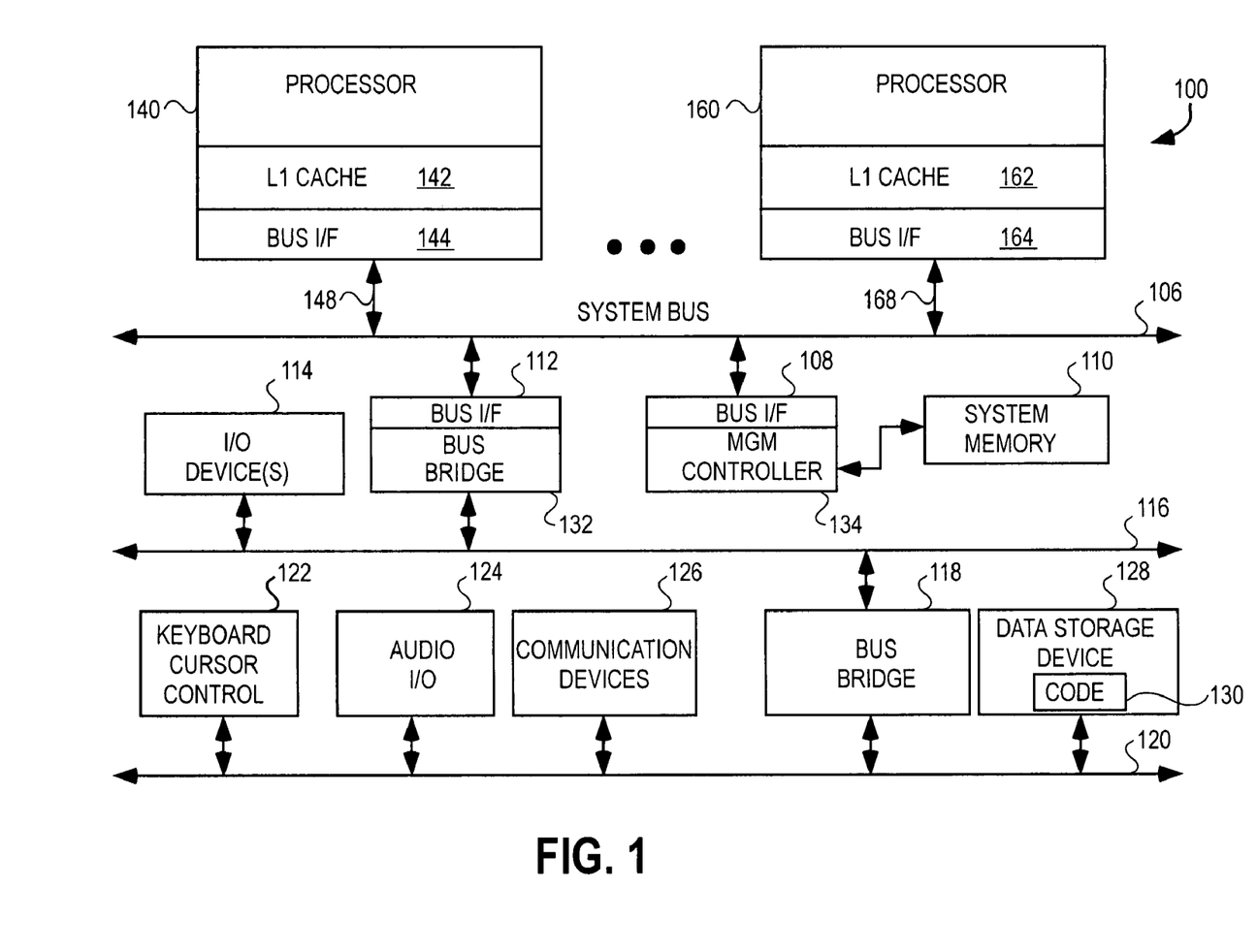
FIG. 1 is a schematic diagram of a multiprocessor system, according to one embodiment.

Referring now to FIG. 1, a schematic diagram of a multiprocessor system 100 is shown, according to one embodiment. The FIG. 1 system may include several processors of which only two, processors 140, 160 are shown for clarity. Processors 140, 160 may include level one caches 142, 162. In some embodiments these level one caches 142, 162 may have the same cache coherency schemes, and in other embodiments they may have differing cache coherency schemes yet still reside on a common system bus 106, or on another form of interprocessor interface. Common examples of cache coherency schemes are valid/invalid (VI) caches, modified/exclusive/shared/invalid (MESI) caches, and modified/owned/exclusive/shared/invalid (MOESI) caches. The "owned" or O state may be less well-known than the M, E, S, or I states. The O state may be considered a modified-shared state, which allows shared data that is modified to remain in the cache. The cache that contains an O cache line takes on the responsibility to update the memory at a later time.

The FIG. 1 multiprocessor system 100 may have several functions connected via bus interfaces 144, 164, 112, 108 with a system bus 106. A general name for a function connected via a bus interface with a system bus is an "agent". Examples of agents are processors 140, 160, bus bridge 132, and memory controller 134. Memory controller 134 may permit processors 140, 160 to read and write from system memory 110. Bus bridge 132 may permit data exchanges between system bus 106 and bus 116, which may be a industry standard architecture ISA bus or a peripheral component interconnect PCI bus. There may be various input/output I/O devices 114 on the bus 116, including graphics controllers, video controllers, and networking controllers. Another bus bridge 118 may be used to permit data exchanges between bus 116 and bus 120. Bus 120 may be a small computer system interface SCSI bus, an integrated drive electronics IDE bus, or a universal serial bus USB bus. Additional I/O devices may be connected with bus 120. These may include keyboard and cursor control devices 122, including mice, audio I/O 124, communications devices 126, including modems and network interfaces, and data storage devices 128, including magnetic disk drives and optical disk drives. Software code 130 may be stored on data storage device 128.

In other embodiments, processors 140, 160 may be connected by dedicated point-to-point interfaces. For example, processor 140 maybe connected to processor 160 by one point-to-point interface, and processor 140 may be connected to bus bridge 132 by a second point-to-point interface. In some embodiments, bus bridges may be replaced by other interfaces. System memory 110 may be subdivided, with a portion thereof connected via a third point-to-point interface with processor 140. The general term "interprocessor interface" may be used to include both system busses and point-to-point interfaces.

Figure 2:
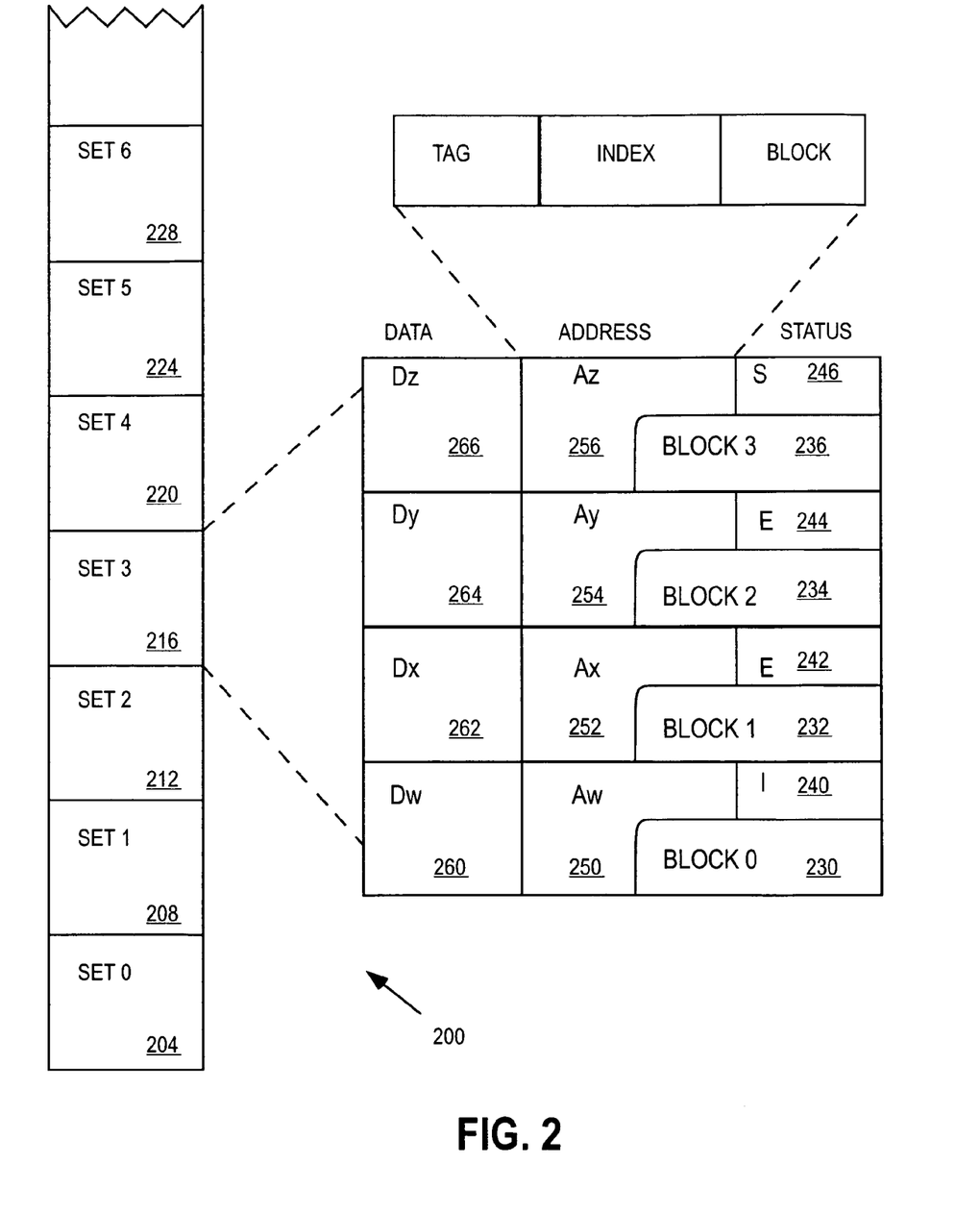
FIG. 2 is a diagram of a cache, showing the allocation of the cache structure into sets, blocks, and fields, according to one embodiment of the present invention.

Referring now to FIG. 2, a diagram of a cache is shown, showing the allocation of the cache structure into sets, blocks, and fields, according to one embodiment of the present invention. Caches generally do not store individual memory locations but rather the contents of blocks of memory called "cache lines". In common parlance the terms "blocks" in connection with a cache may indicate a location, and "cache lines" in connection with a cache may indicate the contents of the corresponding block. Caches may be categorized into fully associative, set associative, and direct mapped. In a fully associative cache, blocks from memory may go into any of the block locations within the cache. In a set-associative cache, a given block from memory may be placed within any of the blocks within one particular subset of the cache called a "set". Finally, in a direct mapped cache, a given block from memory may be placed only within a specific block of the cache.

In the FIG. 2 embodiment, there are many sets and each set has four blocks. This can be called a four-way set associative cache. In general if each set has n blocks, that cache may be called an n-way set associative cache. Note that a fully associative cache may be considered an n-way set associative cache with only one set and with n being the total number of blocks. Similarly a direct mapped cache may be considered a 1-way set associative cache where the number of blocks equals the number of sets.

FIG. 2 shows a number of sets, set 0 204, set 1 208, up to and extending beyond set 6 228. Set 3 216 is shown expanded to show the included blocks, block 0 230 through block 3 236. Each block has a data, address, and status fields. For example, block 2 includes data Dy 264, address Ay 254, and status E (exclusive) 244. In some embodiments, the address field may include subfields called tag, index, and block as shown in FIG. 2. The block may refer to the block number, the index may refer to the set number, and the tag may be the additional bits required to form an address. In other embodiments, the address field may include only the tag. The use of the tag only may be sufficient as the other parts of the address may be supplied by context.

Figure 3:
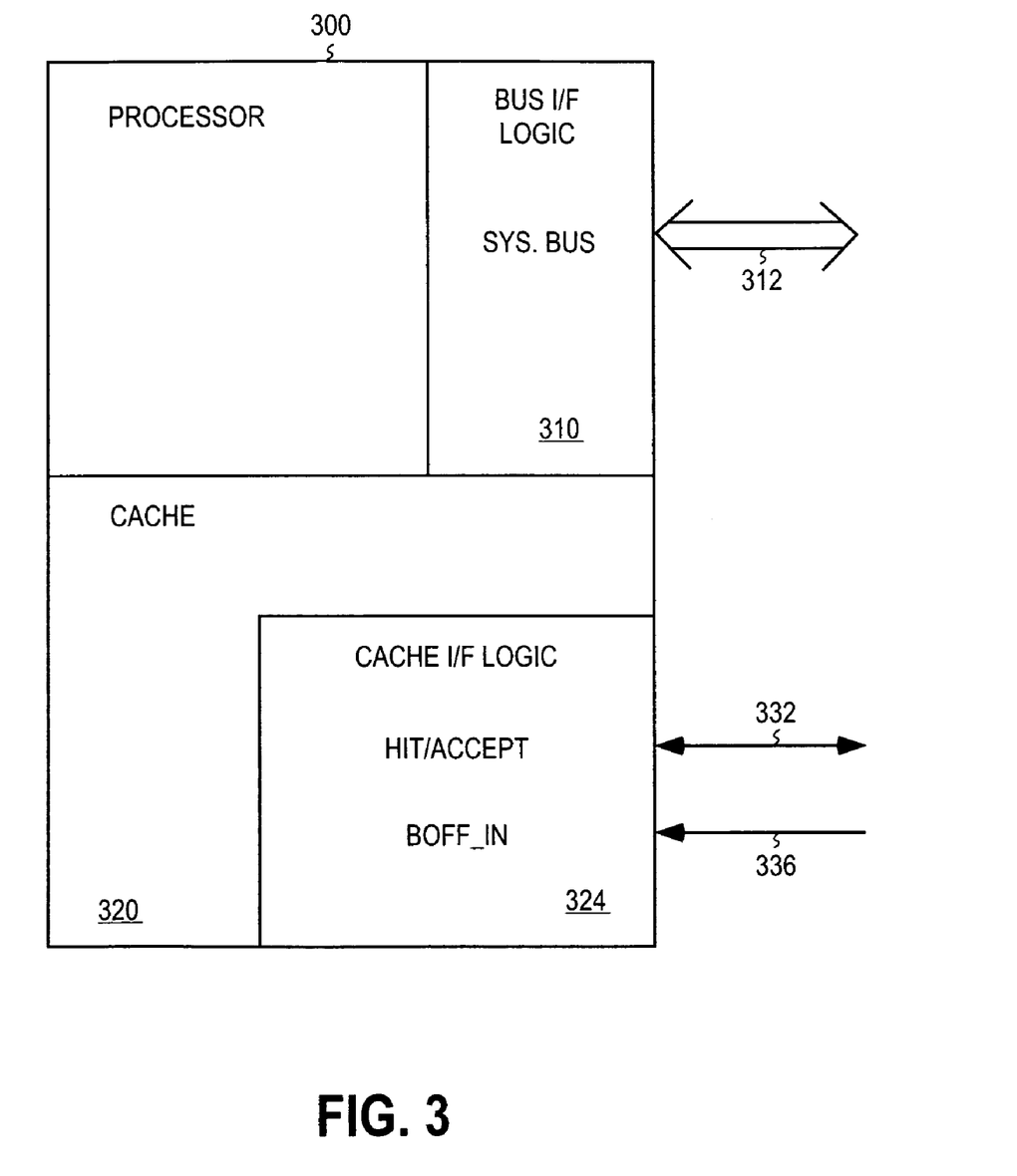
FIG. 3 is a schematic diagram of a processor with accept and backoff signal lines, according to one embodiment of the present disclosure.

Referring now to FIG. 3, a schematic diagram of a processor 300 with accept and backoff signal lines is shown, according to one embodiment of the present disclosure. Processor 300 includes a cache 320 and a bus interface logic 310 with a bus stub 312 for connecting to a system bus. The bus interface logic 310 is one particular example of an interprocessor interface logic, for connecting with an interprocessor interface. In other embodiments, the interprocessor interface logic could be a point-to-point interface logic, for connecting with a point-to-point interface.

The cache 320 may be a write-back cache. If a cache line within cache 320 is dirty (modified M or owned O), then that dirty cache line will remain in cache 320 without updating system memory until evicted. In some embodiments, a cache line may be evicted when another cache line needs to be loaded into the cache due to a cache miss on a memory transaction. The existing cache line to be evicted may be selected by one of several strategies, including random selection, least-recently-used selection, and first-in first-out selection. In other cases, a dirty cache line may be evicted due to a memory transaction in another processor, forcing the dirty cache line to go into an invalid state. When evicting the dirty cache line, the updated data within the dirty cache line could be lost unless the dirty cache line is written someplace else during the eviction process. In some cases the dirty cache line may be written to system memory. However, in the FIG. 3 embodiment, cache 320 may initiate a write-line transaction that includes a snoop for available replacement blocks in other agents with cache.

As processor 300 may be used in a multiprocessor system including other processors that may initiate a write-line transaction that includes a snoop for available replacement blocks in other agents with cache, processor 300 may be designed to respond to such a snoop itself. The response to such a snoop may take the form of looking for cache lines within cache 320 that are available to serve as replacement blocks for a dirty cache line of another processor. In order to be considered available to serve as a replacement block within cache 320, the potential replacement block should meet the criteria for holding such a cache line. For example, let processor 300 and the other processor utilize the FIG. 2 cache 200 design, and let the other processor hold the dirty cache line in its set 3. Then processor 300 may have four blocks that are potential replacement blocks: the four blocks within cache 320's set 3. In general, if a processor has an n-way set associative cache, it may have n potential replacement blocks.

In addition to belonging to the correct set, the potential replacement block should be otherwise available. In one embodiment, if a potential replacement block is in the invalid I state, then it may be used as a replacement block with little affect on the other processor's performance. Hence in that embodiment the snoop for potential replacement blocks may include searching the potential replacement blocks for those in an invalid I state.

In another embodiment, the snoop for potential replacement blocks may include searching the potential replacement blocks for those in an invalid I state, and, if there are none in an I state, then further searching the potential replacement blocks for those in a shared S state. When a cache line is in an S state, there is another copy in at least one of the other processor's caches. It would be possible to write the dirty cache line over a copy of a cache line in an S state, preserving the at-least-one other copy of that cache line somewhere in one of the processors' caches. Even though there may be additional bus cycles to determine whether the remaining cache lines of the S grouping should in an S state or converted to an exclusive E state, this may still be more efficient of system resources than writing the dirty cache line to system memory.

If processor 300 determines that it has an available replacement block for the dirty cache line of the other processor, it may signal the existence of this available replacement block in a message sent over the system bus. In other embodiments, the message may be sent over another form of interprocessor interface, such as a point-to-point interface. However, it may prove advantageous to utilize an additional signal to signify that processor 300 may be the one processor of several that wishes to accept the dirty cache line into its available replacement block, instead of other available replacement blocks within other processors' caches. In one embodiment, a separate Accept signal line may be used. However, in the FIG. 3 embodiment the Accept signal may be carried on a Hit/Accept signal 332, controlled by cache interface logic 324 within cache 320. A Hit signal line may be previously existing in a processor to signal a cache "hit" during snoop operations resulting from a memory read-line transaction. However, the Hit signal line may be unused during memory write-line transactions, such as a cache line eviction. Therefore, in the FIG. 3 embodiment, the Hit signal line is replaced with a combination Hit/Accept signal 332. During memory read-line transactions, the Hit/Accept signal 332 may indicate a cache hit by taking a logical true value. During memory write-line transactions, the Hit/Accept signal 332 may indicate a willingness to accept a dirty cache line into an available replacement block by taking a logical true value. In other embodiments, other forms of signaling an "accept" may be implemented.

A backoff input BOFF-IN 336 signal line may also be used in cache interface logic 324. In one embodiment, if BOFF_IN 336 is held true during a snoop for replacement blocks, then processor 300 will not accept a dirty cache line into its available replacement block (if any) and instead defer to other processors. If BOFF_IN 336 is held false during a snoop for replacement blocks, then processor 300 may accept a dirty cache line into its available replacement block (if any). In one embodiment, BOFF_IN 336 may be sampled by processor 300 after asserting the Hit/Accept signal 332. In other embodiments, other forms of signaling a "backoff" may be implemented.

Figure 4:
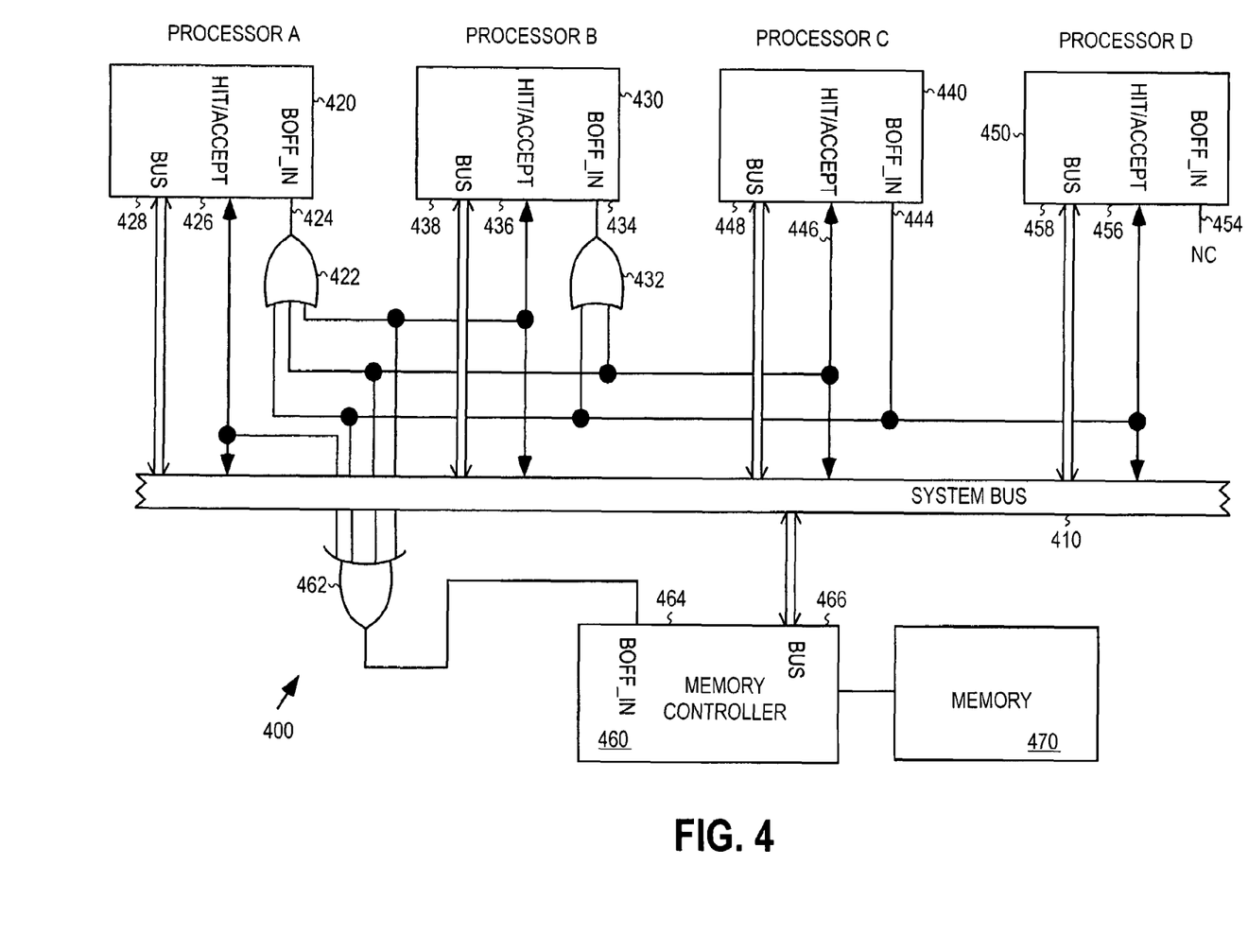
FIG. 4 is a schematic diagram of a bus-connected multiprocessor system employing accept and backoff signal lines, according to one embodiment of the present disclosure.

Referring now to FIG. 4, a schematic diagram of a bus-connected multiprocessor system 400 employing accept and backoff signal lines is shown, according to one embodiment of the present disclosure. In one embodiment, processor A 420, processor B 430, processor C 440, and processor D 450 may each function as a processor 300 of the FIG. 3 embodiment. The multiprocessor system 400 also may include a system bus 410 serving as an interprocessor interface, and a memory controller 460 for interfacing memory 470 in the system 400.

In order to inhibit more than one processor from accepting a dirty cache line from another processor, the Hit/Accept signals 426, 436, 446, 456 of processor A 420, processor B 430, processor C 440, and processor D 450, respectively, may be combined and presented to the backoff signals BOFF_IN 424, 434, 444, 454. The combining of the Hit/Accept signals 426, 436, 446, 456 may be made using the gates 422, 432 shown in the FIG. 4 embodiment. However, there may be many other combinations that will also serve the functionality of inhibiting more than one processor from accepting a dirty cache line from another processor. The embodiment shown favors processor D 450 to accept a dirty cache line, as its BOFF_IN 454 input is not connected. Similarly processor C 440 may accept a dirty cache line unless processor D 454 may accept one, and processor B 430 may accept a dirty cache line unless either processor C 440 or processor D 450 may accept one. Finally processor A 420 may accept a dirty cache line only when none of the other processors may.

Memory controller 460 also may include a BOFF_IN 464. In one embodiment, if BOFF_IN 464 is true during a snoop phase subsequent to a write-line request, the memory controller 460 may not accept the dirty cache line for writing into memory 470. In the FIG. 4 embodiment, the Hit/Accept signals 426, 436, 446, 456 are each gated via gate 462 to the BOFF_IN 464, and when any of the Hit/Accept signals 426, 436, 446, 456 is held true, BOFF_IN 464 will be held true. In this manner, when any of the processors is able to accept a dirty cache line from another processor, memory controller 460 may not accept that dirty cache line.

In one example, consider that processor B 430 includes a dirty cache line, and that an event has occurred that induces an eviction of that dirty cache line. Then processor B 430 generates a write-line request over system bus 410. Consider for this example that both processor A 420 and processor C 440 have in their appropriate cache sets a block currently in status invalid I. Then when processor A 420 and processor C 440 perform a snoop for an available replacement block, these blocks in invalid I status will be determined to be available replacement blocks. At this time bus messages to this effect may be transmitted to processor B 430. Also processor A 420 and processor C 440 may set true Hit/Accept 426 and Hit/Accept 446, respectively. Now processor C 440 may subsequently read a logic false signal at its BOFF_IN 444. But processor A 420 will have the logic true signal from Hit/Accept 446 applied via gate 442 to its BOFF_IN 424. Therefore processor A 420 will "backoff" and not accept the dirty cache line, permitting processor C 440 to accept the dirty cache line instead. The logic true on Hit/Accept 426 and Hit/Accept 446 may also be conveyed via gate 462 to BOFF_IN 464 of the memory controller 460, inhibiting memory controller 4609 from updating memory 470 with the dirty cache line.

The Hit/Accept signals 426, 436, 446, 456 may also be presented to the system bus 410 for use as Hit signals when performing a response to a snoop phase subsequent to a read-line request.

Figure 5:
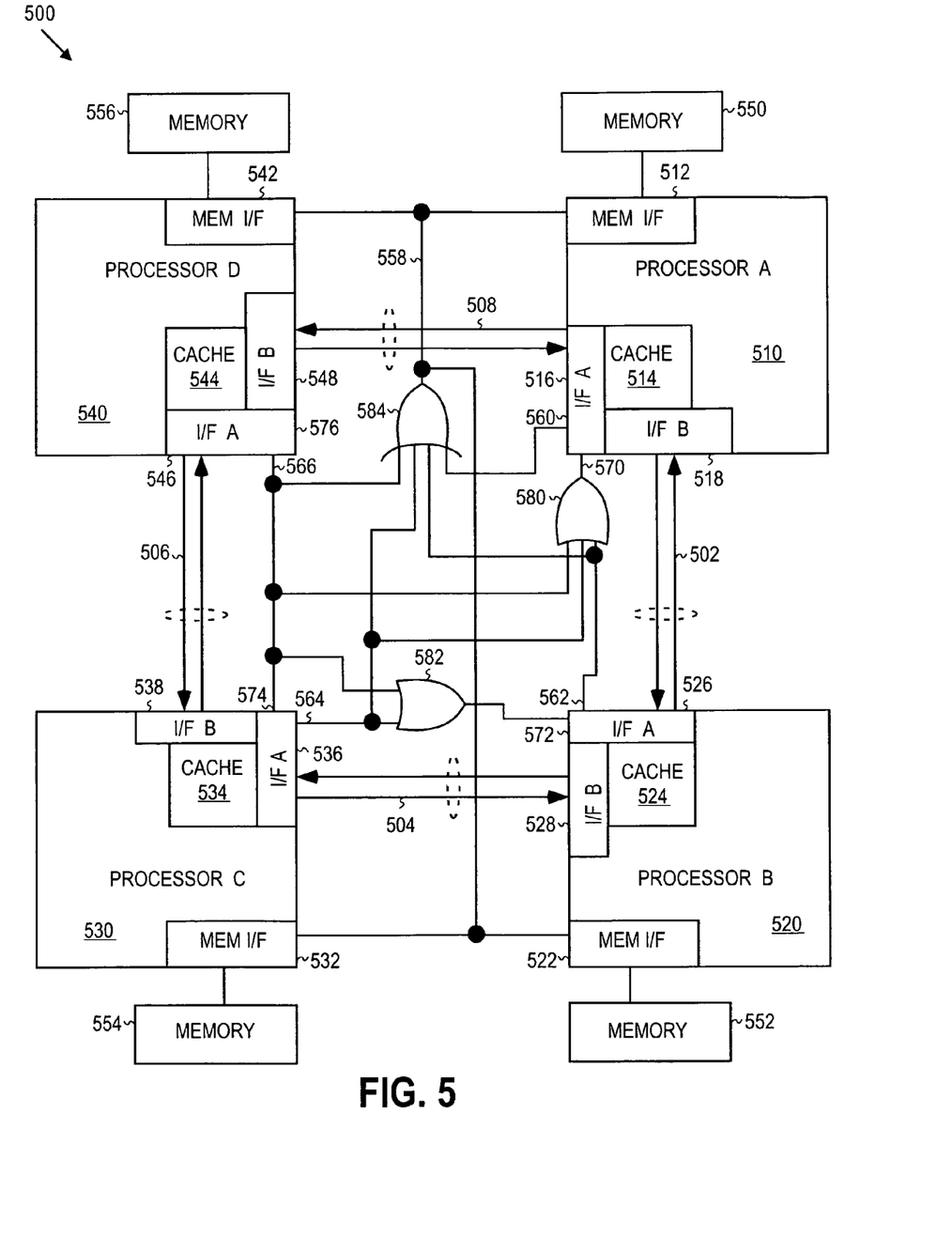
FIG. 5 is a schematic diagram of a point-to-point connected multiprocessor system employing accept and backoff signal lines, according to another embodiment of the present disclosure.

Referring now to FIG. 5, a schematic diagram of a point-to-point connected multiprocessor system 500 employing accept and backoff signal lines is shown, according to another embodiment of the present disclosure. In this embodiment, a system bus is not used as an interprocessor interface. Instead, several point-to-point interfaces 502, 504, 506, 508 are used as interprocessor interfaces connecting processor A 510, processor B 520, processor C 530, and processor D 540. Each processor may include two or more point-to-point interface logics for the point-to-point interfaces, such as processor A 510 including point-to-point interface logic A 516 and point-to-point interface logic B 518. Point-to-point interface logics A 516 and B 518 may be equivalent, or may include specific tailoring for given applications.

Each processor, for example processor A 510, may include a memory interface 512 for connection with a portion of system memory 550. Memory interface 512 may perform many of the functions normally supported by a memory controller. Processors may read from or write to other processor's memory, but may need to go through one or more point-to-point interfaces in so doing. Similarly, each processor, for example processor A 510, may include a cache 514. The cache may read from or write to its own processor's memory, or may read from or write to another processor's memory. For example, cache 514 of processor A 510 may read a cache line from memory 552 of processor B 520 over point-to-point interface 502. Additional point-to-point interfaces may be used to connect various input/output devices to the processors (not shown).

Caches 514, 524, 534, 544 may function in a similar manner to cache 320 of FIG. 3. Consider the cache 514 of processor A 510. When a dirty cache line is evicted, cache 514 may initiate a write-line transaction that includes a request for a snoop for available replacement blocks in the caches 524, 534, 544 of processor B 520, processor C 530, and processor D 540. Rather than proceeding over a bus, the request for a snoop proceeds over point-to-point interfaces 502, 504, 506, 508. If one or more of the other caches 524, 534, 544 has a cache line in an invalid I state within a potential replacement block, the dirty cache line being evicted from cache 514 may be written to a replacement block within caches 524, 534, 544. In other embodiments, an available replacement block may include a cache line in an invalid I state, or in a shared S state. One or more of these caches may signal the availability of a replacement block with an interprocessor message sent over one or more of the point-to-point interfaces 502, 504, 506, 508.

In addition, processor A 510, processor B 520, processor C 530, and processor D 540 may include an accept signal 560, 562, 564, 566, respectively. These accept signals may indicate whether the corresponding processor's cache includes an available replacement block for the dirty cache line, where a logic true on the accept signal may indicate the presence of an available replacement block. Processor A 510, processor B 520, processor C 530, and processor D 540 may furthermore include a backoff signal 570, 572, 574, 576. In one embodiment, if a backoff signal is held to a logic true, the corresponding processor may be inhibited from accepting the dirty cache line into its own available replacement block (if any). Conversely, if a backoff signal is held to a logic false, the corresponding processor may accept the dirty cache line into its own available replacement block (if any). The accept and backoff signals are shown connected to point-to-point interface logics, but in other embodiments may be connected with other circuits within the processors.

In a similar manner as in the FIG. 4 embodiment, the accept signals 560, 562, 564, 566 may be may be combined and presented to the backoff signals 570, 572, 574, 576 in order to inhibit more than one processor from accepting a dirty cache line from another processor. The combining of the accept signals 560, 562, 564, 566 may be made using the gates 580, 582. However, there may be many other combinations that will also serve the functionality of inhibiting more than one processor from accepting a dirty cache line from another processor. The embodiment shown favors processor D 540 to accept a dirty cache line, as its backoff signal 576 input is not connected. Similarly processor C 530 may accept a dirty cache line unless processor D 540 may accept one, and processor B 520 may accept a dirty cache line unless either processor C 530 or processor D 540 may accept one. Finally processor A 510 may accept a dirty cache line only when none of the other processors may accept one.

The accept signals 560, 562, 564, 566 may also be combined by gate 584 to form a memory backoff signal 558. In one embodiment, memory backoff signal 558 may be monitored by memory interfaces 512, 522, 532, 542. If memory backoff signal 558 is true, the memory interfaces 512, 522, 532, 542 may not accept the dirty cache line for writing into memory 550, 552, 554, 556, respectively. In this manner, when any of the processors is able to accept a dirty cache line from another processor, memory interfaces 512, 522, 532, 542 may not accept that dirty cache line.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
a cache memory to evict a first dirty cache line from a first block; and
an interprocessor interface logic coupled to said cache memory and to an interprocessor interface, to initiate a request for a first replacement block in a second processor to store said first dirty cache line before the dirty cache line is stored to memory,
wherein said cache is to signal an acceptance signal when said interprocessor interface logic receives a request for a second replacement block for a second dirty cache line.

2. The processor of claim 1, wherein said request is subsequent to a write line request of said first dirty cache line.

3. The processor of claim 1, wherein said interprocessor interface logic is to send said first dirty cache line to said second processor subsequent to an interprocessor interface message signal from said second processor.

4. The processor of claim 3, wherein said interprocessor interface message signal is sent when said first replacement block is in an invalid state.

5. The processor of claim 3, wherein said interprocessor interface message signal is sent when said first replacement block is in a shared state.

6. The processor of claim 1, wherein said interprocessor interface logic receives said request for said second replacement block for said second dirty cache line from a third processor coupled to said interprocessor interface.

7. The processor of claim 1, wherein said acceptance signal indicates that said second replacement block is in an invalid state.

8. The processor of claim 1, wherein said acceptance signal indicates that said replacement block is in a shared state.

9. The processor of claim 1, wherein second replacement block receives said second dirty cache line when a backoff signal input of said processor is held false.

10. The processor of claim 1, wherein the first dirty cache line is to be removed from the first block of the cache memory and stored in the first replacement block of the second processor.

11. A system comprising:
an interprocessor interface;
an audio input output coupled via an interface to said interprocessor interface;
a first processor, including a first cache to evict a dirty cache line, and a first interprocessor interface logic coupled to said first cache and to said interprocessor interface; to initiate a request along said interprocessor interface corresponding to said dirty cache line;
a second processor, including a second cache with a first replacement block, and a second interprocessor interface logic coupled to said second cache and said interprocessor interface, to respond to said request when a first replacement block is available to receive said dirty cache line, said second processor to store the dirty cache line before it is stored to memory; and
a third processor, including a third cache with a second replacement block, and a third interprocessor interface logic coupled to said third cache and said interprocessor interface, to respond to said request when a second replacement block is available to receive said dirty cache line.

12. The system of claim 11, wherein said second processor sends a true value on an acceptance signal when said first replacement block is available, and wherein said third processor does not indicate that it is able to receive said dirty cache line when said true value on said acceptance signal is received on a backoff input of said third processor.

13. The system of claim 11, wherein the dirty cache line is to be removed from the first cache and stored in the first replacement block of the second processor.

14. A system comprising:
an interprocessor interface;

an audio input output coupled via an interface to said interprocessor interface;

a first processor, including a first cache to evict a dirty cache line, and a first interprocessor interface logic coupled to said first cache and to said interprocessor interface; to initiate a request along said interprocessor interface corresponding to said dirty cache line;

a second processor, including a second cache with a first replacement block, and a second interprocessor interface logic coupled to said second cache and said interprocessor interface, to respond to said request when a first replacement block is available to receive said dirty cache line, said second processor to store the dirty cache line before it is stored to memory; and a memory controller coupled to said interprocessor interface, including a backoff input to indicate that said memory controller may not receive said dirty cache line.

15. The system of claim 14, wherein said second processor sends a true value on an acceptance signal when said first replacement block is available, and wherein said memory controller does not receive said dirty cache line when said true value on an acceptance signal is in input to said backoff input of said memory controller.

16. The system of claim 14, wherein the dirty cache line is to be removed from the first cache and stored in the first replacement block of the second processor.

17. A method comprising:

evicting a dirty cache line from a first cache in a first processor;

sending a request for a first replacement block to a second processor;

if a first replacement block is available, then sending an interprocessor interface message from said second processor indicating the availability of said first replacement block;

sending said first dirty cache line from said first processor to said first replacement block in said second processor before sending the first dirty cache line to memory;

sending an acceptance signal from said second processor to indicate that said second processor may receive said first dirty cache line; and inhibiting a device from one or more of indicating availability of a second replacement block or accepting said dirty cache line.

18. The method of claim 17, further comprising receiving said first dirty cache line.

19. The method of claim 17, further comprising determining whether said first replacement block is in an invalid state.

20. The method of claim 17, further comprising determining whether said first replacement block is in a shared state.

21. The method of claim 17, wherein inhibiting the device comprises inhibiting a third processor from sending an interprocessor interface message indicating the availability of said second replacement block.

22. The method of claim 21, wherein said inhibiting said third processor includes sending said acceptance signal from said second processor to said third processor.

23. The method of claim 22, wherein said third processor receives said acceptance signal in a backoff input.

24. The method of claim 17, wherein inhibiting the device comprises inhibiting a memory controller from accepting said dirty cache line.

25. The method of claim 24, wherein said inhibiting said memory controller includes sending said acceptance signal from said second processor to said memory controller.

26. The method of claim 25, wherein said memory controller receives said acceptance signal in a backoff input.

27. The method of claim 17, further comprising removing the dirty cache line from the first cache of the first processor and storing the dirty cache line in the first replacement block of the second processor.

* * * * *